United States Patent
Hayashi et al.

(10) Patent No.: US 9,849,859 B2
(45) Date of Patent: Dec. 26, 2017

(54) BUCKLE DEVICE

(71) Applicant: KABUSHIKI KAISHA TOKAI-RIKA-DENKI-SEISAKUSHO, Aichi-ken (JP)

(72) Inventors: Koji Hayashi, Aichi-ken (JP); Takuhiro Saito, Aichi-ken (JP); Makoto Matsuzaki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/209,210

(22) Filed: Jul. 13, 2016

(65) Prior Publication Data
US 2017/0021796 A1    Jan. 26, 2017

(30) Foreign Application Priority Data
Jul. 22, 2015    (JP) ................. 2015-145045

(51) Int. Cl.
| B60R 22/20 | (2006.01) |
| A44B 11/25 | (2006.01) |
| B60R 22/03 | (2006.01) |
| F16L 3/01  | (2006.01) |
(Continued)

(52) U.S. Cl.
CPC .......... *B60R 22/20* (2013.01); *A44B 11/2546* (2013.01); *A44B 11/2561* (2013.01); *B60R 22/03* (2013.01); *F16L 3/01* (2013.01); *B60R 2022/1806* (2013.01); *B60R 2022/4816* (2013.01)

(58) Field of Classification Search
CPC ............ B60R 22/20; B60R 2022/1806; A44B 11/2546; A44B 11/2561; G01L 5/102; G01L 5/103; F15B 15/19
USPC ............................................ 280/806; 60/632
See application file for complete search history.

(56) References Cited

U.S. PATENT DOCUMENTS

| 4,163,128 A |   | 7/1979 | Miscowicz |
| 4,385,775 A | * | 5/1983 | Shimogawa ........ B60R 22/1955 |
|             |   |        | 280/805 |

(Continued)

FOREIGN PATENT DOCUMENTS

| CN | 203485858 U | 3/2014 |
| CN | 203793281 U | 8/2014 |

(Continued)

OTHER PUBLICATIONS

Extended European Search Report issued in a corresponding EP application No. 16180078.4 dated Jan. 24, 2017.

*Primary Examiner* — Faye M Fleming
(74) *Attorney, Agent, or Firm* — Roberts Mlotkowski Safran Cole & Colderon P.C.

(57) ABSTRACT

In a buckle device, cord portions that are pulled out from a distal end portion in a longitudinal direction of a helical portion of a curl cord are electrically and mechanically connected to a terminal of a buckle switch of a buckle. The distal end portion in the longitudinal direction of the helical portion of the curl cord is held by a holding bracket that is provided at a first cover component of a buckle cover. Consequently, even when the buckle cover is moved, excellent connections can still be maintained between the cord portions of the curl cord and the terminal of the buckle switch of the buckle.

11 Claims, 9 Drawing Sheets

(51) Int. Cl.
   *B60R 22/48*    (2006.01)
   *B60R 22/18*    (2006.01)

(56)            References Cited

U.S. PATENT DOCUMENTS

5,152,552 A  * 10/1992  Ikegaya .................. B60R 22/26
                                                      280/806
   5,568,940 A  * 10/1996  Lane, Jr. ............. B60R 22/1952
                                                      180/268
   5,671,949 A  *  9/1997  Bauer ................. B60R 22/1952
                                                      280/806
2016/0304049 A1 * 10/2016  Hayashi ............. A44B 11/2561
2016/0304050 A1 * 10/2016  Murasaki ........... A44B 11/2561

FOREIGN PATENT DOCUMENTS

DE       102013009488 A1    12/2014
   WO        2012-101727 A1     8/2012

* cited by examiner

BUCKLE DEVICE

CROSS-REFERENCE TO RELATED APPLICATION

This application is based on and claims priority under 35 USC 119 from Japanese Patent Application No. 2015-145045 filed on Jul. 22, 2015, the disclosure of which is incorporated by reference herein.

BACKGROUND

Technical Field

The present invention relates to a buckle device that moves a buckle of a seat belt device is moved.

Related Art

A buckle device has been developed in which a cord member is connected to a movable buckle (see German Patent Laid-Open No. 102013009488 as an example). In this type of buckle device, if the buckle is moved, a load that causes the buckle and the cord member to move away from each other acts on the connection portion between the buckle and the cord member.

SUMMARY

In consideration of the above-described circumstances, the present invention is to provide a buckle device that makes it possible to either prevent or suppress a load that might cause the buckle and the cord component to move away from each other from acting on the connection portion between the buckle and the cord component.

A buckle device according to a first aspect includes: a buckle with which a tongue of a seatbelt device is engaged, and that is able to move relative to a vehicle body; a cord member whose distal end portion in a longitudinal direction is connected to the buckle side; and a distal end side holding section that is provided so as to be able to move together with the buckle, and that holds the cord member at a position of the cord member, which position is further toward a base end side in the longitudinal direction of the cord member than the distal end portion of the cord member.

In the buckle device according to the first aspect, the distal end side holding section holds the cord member at the position of the cord member which position is further toward the base end side in the longitudinal direction of the cord member than the distal end portion of the cord member. Due to the distal end side holding section being provided such that it is able to move together with the buckle, a portion of the cord member, that is held by the distal end side holding section is able to move together with the buckle. As a result, when the buckle is moved, a load that might cause the connection between the distal end portion in the longitudinal direction of the cord member and the buckle side to separate is either prevented or suppressed from acting between the distal end portion in the longitudinal direction of the cord member and the buckle side.

A buckle device according to a second aspect is in that, in the buckle device according to the first aspect, an expanding and contracting portion that is able to expand and contract in the longitudinal direction of the cord member is provided on the cord member at a side which is further toward the base end side in the longitudinal direction of the cord member than the distal end portion the cord member, and the distal end side holding section holds a distal end portion in a longitudinal direction of the expanding and contracting portion.

In the buckle device according to the second aspect, the distal end portion in the longitudinal direction of the expanding and contracting portion of the cord member is held by the distal end side holding section. Due to this, a portion of the cord member (the expanding and contracting portion), which portion is at further toward the base end side in the longitudinal direction than the distal end portion of the expanding and contracting portion, expands and contracts together with the movement of the buckle, on the other hand, the distal end portion of the expanding and contracting portion, and a portion of the cord member, which portion is at further toward the distal end side in the longitudinal direction than the distal end portion of the expanding and contracting portion, are moved together with the buckle. As a result, any load that might cause the distal end portion in the longitudinal direction of the cord member and the buckle side to move away from each other is either prevented or suppressed from acting between the distal end portion in the longitudinal direction of the cord member and the buckle side.

A buckle device according to a third aspect is in that, in the buckle device according to the second aspect, the expanding and contracting portion is formed in a helical shape whose central axis is aligned with the longitudinal direction of the cord member, and is able to expand and contract elastically in a direction of the central axis.

According to the buckle device according to the third aspect, the expanding and contracting portion of the cord member is formed in a helical shape whose central axis is aligned with the longitudinal direction of the cord member, and is able to expand and contract elastically in this longitudinal direction. Due to this, it is possible to suppress the occurrence of slackness in the expanding and contracting portion.

A buckle device according to a fourth aspect is in that, in the buckle device according to the third aspect, the distal end side holding section includes: an inner side holding portion that is engaged with the expanding and contracting portion from an inner side in a radial direction of a helix of the expanding and contracting portion; and an outer side holding portion that is engaged with the expanding and contracting portion from an outer side in a radial direction of the helix of the expanding and contracting portion, and that, together with the inner side holding portion, holds the expanding and contracting portion.

According to the buckle device according to the fourth aspect, the expanding and contracting portion of the cord member is engaged from the inner side in the radial direction of the helix of the expanding and contracting portion by the inner side holding portion of the distal end side holding section, and is engaged from the outer side in the radial direction of the helix of the expanding and contracting portion by the outer side holding portion of the distal end side holding section. As a result, the expanding and contracting portion of the cord member is held by the inner side holding portion and the outer side holding portion of the distal end side holding section. Due to this, the expanding and contracting portion of the cord member can be held without the helical configuration of the expanding and contracting portion of the cord member becoming seriously damaged.

A buckle device according to a fifth aspect is in that, in the buckle device according to the third or fourth aspects, the buckle device further includes: a supporting portion that is provided at a vehicle body side, and by which the buckle is movably supported; and a base end side holding section that is provided at the supporting portion, and that holds a base end portion in the longitudinal direction of the expanding and contracting portion.

According to the buckle device according to the fifth aspect, the buckle is movably supported by a supporting portion that is provided on the vehicle body side. A base end side holding section is provided at this supporting portion, and the base end portion in the longitudinal direction of the expanding and contracting portion of the cord member is held by the base end side holding section. Due to this, when the buckle is moved relative to the supporting portion, a load that might cause a portion of the cord member, which is at further toward the distal end side in the longitudinal direction than the base end portion of the expanding and contracting portion to move is either prevented or suppressed from acting on a portion of the cord member, which is at further toward the base end side in the longitudinal direction than the base end portion of the expanding and contracting portion.

A buckle device according to a sixth aspect is in that, in the buckle device according to any one of the first aspect to the fifth aspect, the distal end portion of the cord member, which is connected to the buckle, extends from the distal end portion of the expanding and contracting portion toward a distal end side of the cord member.

As has been described above, in a buckle device according to the above aspects, it is possible to either prevent or suppress a load that might cause the buckle and the cord member to move away from each other from acting on the connection portion between the buckle and the cord member.

BRIEF DESCRIPTION OF THE DRAWINGS

Exemplary embodiments will be described in detail with reference to the following figures, wherein.

DETAILED DESCRIPTION

Next, a buckle device 10 according to exemplary embodiments will be described based on FIG. 1 through FIG. 9. Note that an arrow FR in the drawings indicates a front side of a vehicle to which this buckle device 10 has been applied, while an arrow OUT in the drawings indicates an outer side in a vehicle transverse direction, and an arrow UP indicates a vehicle upper side.

Structure of a First Embodiment

Figure 1:
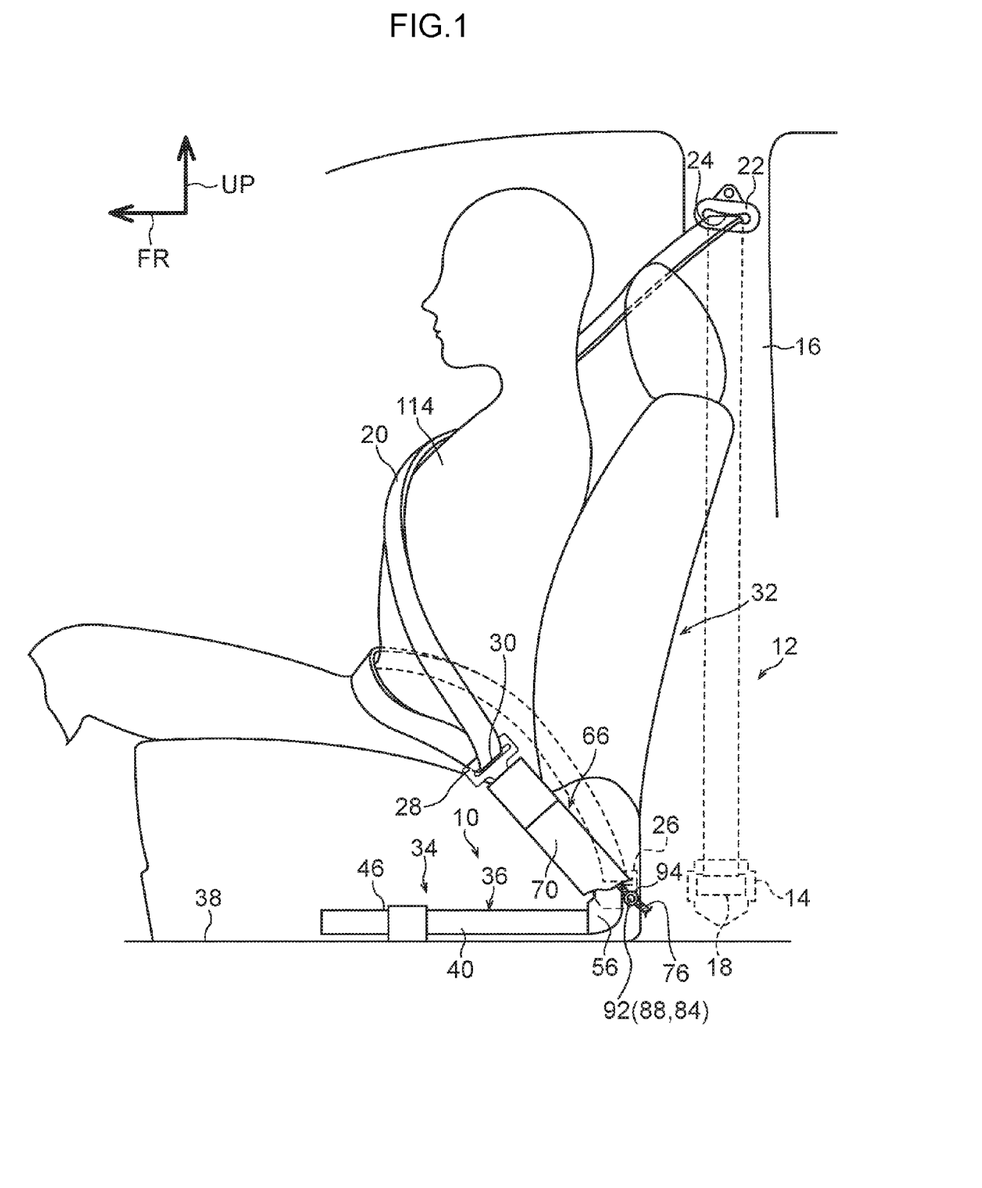
FIG. 1 is a side view showing a seatbelt device to which a buckle device according to a first embodiment is applied.

As is shown in FIG. 1, a buckle device 10 according to a first embodiment structures part of a seat belt device 12. The seat belt device 12 is provided with a webbing retractor (take-up) device 14. The webbing retractor device 14 is fixed to a vehicle body on a vehicle lower side of a vehicle center pillar 16. The webbing retractor device 14 is provided with a spool 18. The direction of a center axis of the spool 18 is along the vehicle front-rear direction, and the spool 18 is able to rotate around its center axis. A base end portion in a longitudinal direction of an elongated belt-shaped webbing 20 is anchored to the spool 18, and the webbing 20 is wound onto an outer circumferential portion of the spool 18. The webbing retractor device 14 is also provided with a spool urging component such as a spiral spring, and the spool 18 is urged in a retraction (take-up) direction, which is the direction of rotation when the webbing 20 is being wound onto the spool 18 by the spool urging component.

The webbing retractor device 14 is also provided with a locking mechanism (not shown in the drawings). The locking mechanism is operated when the vehicle is in an emergency such as in a vehicle collision or the like. When the locking mechanism is operated, the rotation of the spool 18 of the webbing retractor device 14 in a pull-out direction, which is the opposite direction from the retraction direction, is prevented by the locking mechanism, so that the webbing 20 is unable to be pulled off the spool 18.

Furthermore, the webbing retractor device 14 is also provided with a pretensioner (not shown in the drawings). The pretensioner is operated when the vehicle is in an emergency such as in a vehicle collision or the like. When the pretensioner is operated, the spool 18 of the webbing retractor device 14 is rotated in the retraction direction by the pretensioner, so that the webbing 20 is wound onto the spool 18.

A through anchor 22 is provided on the vehicle upper side of the webbing retractor device 14. The through anchor 22 is supported on the vehicle body in the vicinity of an end portion on the vehicle upper side of the center pillar 16. A through anchor slit hole 24 is formed in the through anchor 22, and a distal end side in the longitudinal direction of the webbing 20 that has been pulled out from the spool 18 of the webbing retractor device 14 is inserted through this through anchor slit hole 24 in the through anchor 22 and is then folded back towards the vehicle lower side.

An anchor plate 26 is provided in the vicinity of an end portion on the vehicle lower side of the center pillar 16. A distal end portion of the webbing 20 that has been inserted through the through anchor slit hole 24 in the through anchor 22 and has been folded back towards the vehicle lower side is anchored to this anchor plate 26. A tongue 28 is provided on the portion of the webbing 20 that is located between the anchor plate 26 and the through anchor 22. A slit-shaped webbing insertion hole 30 is formed in the tongue 28, and the webbing 20 is inserted through this webbing insertion hole 30. As a result, the tongue 28 is able to move along the webbing 20.

Figure 2:
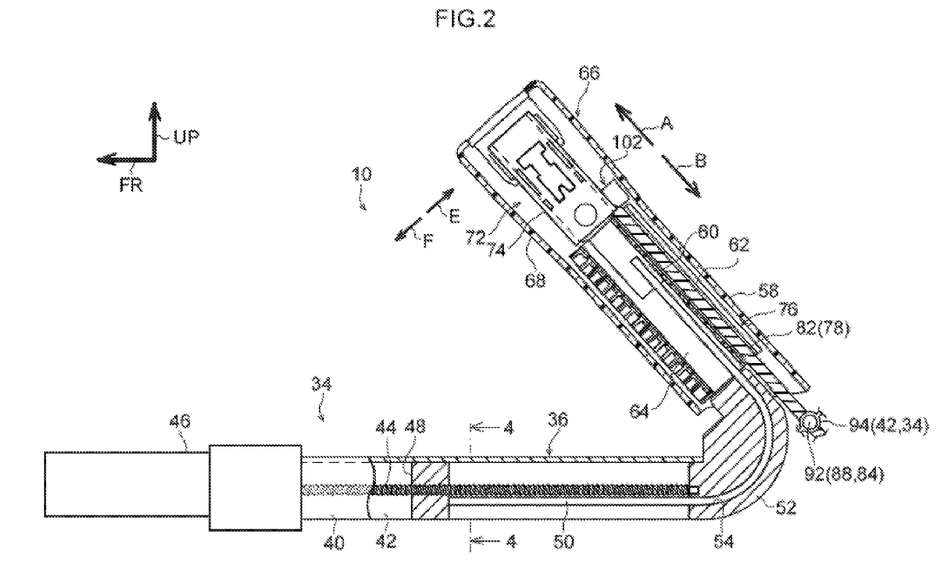
FIG. 2 is a side cross-sectional view of a buckle device according to the first embodiment.
Figure 4:
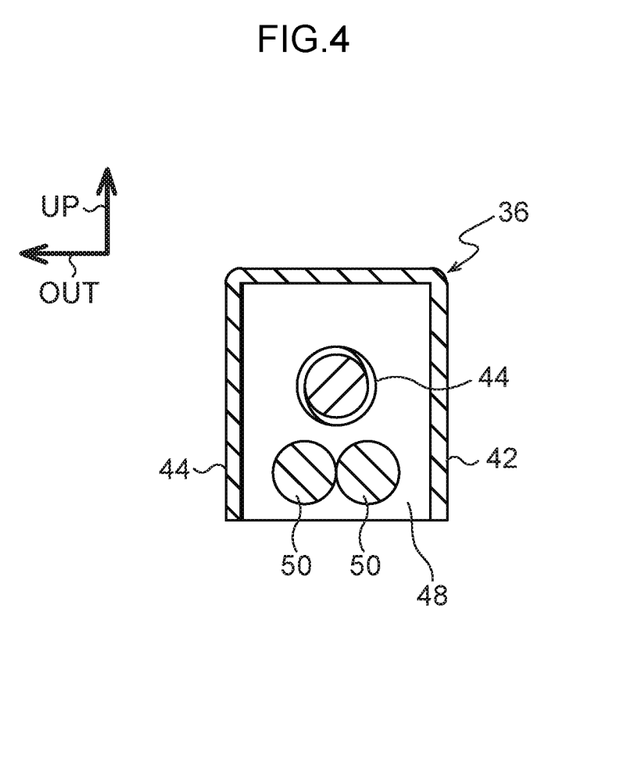
FIG. 4 is a cross-sectional view taken along a line 4-4 in FIG. 3.

The buckle device 10 is provided on the inner side in the vehicle transverse direction of a vehicle seat 32 to which the present seat belt device 12 has been applied. The buckle device 10 is provided with a buckle drive device 34. The buckle drive device 34 is provided with a guide rail 36 serving as a slider guide mechanism that structures a drive force transmission unit and also structures a supporting portion. The guide rail 36 is formed by a metal plate member made from iron or stainless steel or the like, and is fixed by means of a fastening device such as bolts or the like to the vehicle body side such as to a floor portion 38 of the vehicle or to a framework component of the seat 32 or the like. As is shown in FIG. 2, the guide rail 36 is provided with a pair of guide walls 40 and 42 that serve as a slider guide portion. As is shown in FIG. 4, the guide walls 40 and 42 face each other in the vehicle transverse direction, and a drive screw 44 that structures the drive force transmission unit is provided as a drive portion between the guide walls 40 and 42. A direction of the center axis of the drive screw 44 is along the vehicle front-rear direction, and the drive screw 44 is able to rotate freely around this center axis.

As is shown in FIG. 2, a motor actuator 46 is provided as a drive force output unit on the vehicle front side of the guide rail 36. An end portion on the vehicle front side of the drive screw 44 is joined to the motor actuator 46, and the drive screw 44 is rotated around the center axis of the drive screw 44 by drive force output from the motor of the motor actuator 46. The motor actuator 46 is electrically connected to a control unit (not shown in the drawings) such as a motor driver, ECU and the like.

This control unit is electrically connected, for example, to a detection device such as a door open/close detection device such as a courtesy switch or the like that detects open or close of a door of a vehicle that corresponds to a seat to which the present buckle device 10 has been applied, or a vehicle occupant detection device such as a load sensor or the like that is provided in a seat cushion of the seat. The control unit is also electrically connected to a buckle switch (not shown in the drawings) that is provided in a buckle 72 (described below) and that detects whether or not a tongue (not shown in the drawings) is engaged in the buckle 72. The motor actuator 46 is controlled based on electrical signals output from the buckle switch and the detection devices such as the door open/close detection device and the vehicle occupant detection device, and the like.

A slider 48 is provided between the guide wall 40 and the guide wall 42 of the guide rail 36. The slider 48 is formed in a block shape and, as is shown in FIG. 4, side surfaces in the vehicle transverse direction of the slider 48 abut against the guide walls 40 and 42 of the guide rail 36. A screw hole through which the drive screw 44 is penetrated is formed in the slider 48, and the slider 48 is made to slide in the vehicle front-rear direction by the rotation of the drive screw 44 while being guided by the guide walls 40 and 42.

As is shown in FIG. 2, the buckle device 10 is provided with a pair of wire ropes 50 that serve as joining member. The wire ropes 50 are formed in an elongated shape and, as is shown in FIG. 4, are arranged next to each other in the vehicle transverse direction. As is shown in FIG. 2, on the base end side than a central portion in the longitudinal direction of the wire ropes 50, the longitudinal direction of the wire ropes 50 runs along the vehicle front-rear direction, and a base end portion in the longitudinal direction of the wire ropes 50 is joined to the slider 48 at the vehicle lower side of the drive screw 44. Because of this, when the slider 48 is made to slide in the vehicle front-rear direction, the wire ropes 50 are moved in their longitudinal direction.

Furthermore, a wire guide 52 that, together with the guide rail 36, structures the supporting portion is provided on the vehicle rear side of the guide rail 36.
A wire guide groove 54 is formed in the wire guide 52. The wire guide groove 54 is open on an inner side surface in the vehicle transverse direction of the wire guide 50. A cover plate 56 (see FIG. 1) that, together with the guide rail 36 and the wire guide 52, structures the supporting portion is provided on the inner side in the vehicle transverse direction of the wire guide 52. The cover plate 56 is formed by a flat metal plate made from iron or stainless steel or the like, and the wire guide groove 54 of the wire guide 52 is closed off from the inner side in the vehicle transverse direction by the cover plate 56.

One end in the longitudinal direction of the wire guide groove 54 is open on a vehicle front side surface of the wire guide 52. Furthermore, the wire guide groove 54 is curved at a central portion in the longitudinal direction thereof in a direction around an axis that takes the vehicle transverse direction as its axial direction. Another end in the longitudinal direction of the wire guide groove 54 is open on a vehicle upper side surface of the wire guide 52. The wire ropes 50 pass through the wire guide groove 54, and a distal end side than a central portion in the longitudinal direction of the wire ropes 50 extends diagonally upwards towards the front of the vehicle (i.e., in a direction shown by an arrow A in FIG. 2) from the another end in the longitudinal direction of the wire guide groove 54.

The buckle device 10 is also provided with a buckle guide 58 that, together with the guide rail 36, the wire guide 52, and the cover plate 56, structures the supporting portion and serves as a cover supporting component. The buckle guide 58 is formed from a synthetic resin material in a cylindrical shape having a rectangular cross-section. A longitudinal direction of the buckle guide 58 is along in a direction that slopes in the vehicle front-rear direction relative to the vehicle up-down direction (i.e., in the directions shown by the arrow A and the arrow B in FIG. 2). An end portion on the vehicle lower side of the buckle guide 58 is fixed either directly or indirectly via another component to the wire guide 52. As a result, the buckle guide 58 is fixed to the vehicle body via the wire guide 52 and the guide rail 36.

A partition wall 60 is formed on an inner side of the buckle guide 58. The partition wall 60 is formed in an intermediate portion in the transverse direction of the buckle guide 58, and is formed continuously over substantially the entire range in the longitudinal direction of the buckle guide 58. A space on an inner side of the buckle guide 58 is partitioned by the partition wall 60 into a cord housing portion 62 on one side (i.e., on the side shown by the arrow E in FIG. 2) in the transverse direction of the buckle guide 58, and a wire housing portion 64 on another side (i.e., on the side shown by the arrow F in FIG. 2) in the transverse direction of the buckle guide 58. The wire ropes 50 that extend from the another end in the longitudinal direction of the wire guide groove 54 of the wire guide 52 diagonally upwards towards the vehicle front (i.e., in the direction shown by the arrow A in FIG. 2) pass through an inner side of the wire housing portion 64 of the buckle guide 58.

As is shown in FIG. 2, the buckle device 10 is also provided with a buckle cover 66 that serves as a movable component. The buckle cover 66 is provided with a first cover component 68 that is shown in FIG. 2, and a second cover component 70 that is shown in FIG. 1. The first cover component 68 and the second cover component 70 are formed from a synthetic resin material, and the buckle cover 66 is formed by assembling the first cover component 68 and the second cover component 70 together in the vehicle transverse direction into a single body. In a state in which the first cover component 68 and the second cover component 70 are assembled together, the buckle guide 66 forms a cylindrical tube shape whose longitudinal direction slopes in the vehicle front-rear direction relative to the vehicle up-down direction (i.e., in the directions shown by the arrow A and the arrow B in FIG. 2).

As is shown in FIG. 2, the buckle guide 58 is inserted into the inner side of the buckle cover 66, and the buckle cover 66 is able to move in the longitudinal direction of the buckle guide 58 (i.e., in the directions shown by the arrow A and the arrow B in FIG. 2) while being guided by the buckle guide 58.

The buckle 72 is provided in a vehicle upper side portion of the interior of the buckle cover 66. The buckle 72 is provided with a buckle body 74. The buckle body 74 is formed having a U-shaped cross-section whose wall portions extend towards the inner side in the vehicle transverse direction from both end portions in the transverse direction of a bottom plate whose longitudinal direction is substantially the same direction as the longitudinal direction of the buckle cover 66. Structural components (not shown in the drawings) of the buckle 72 such as a latch and the like are provided on the inside of the buckle body 74. When the tongue 28 is inserted between the two wall portions of the buckle 74 from a direction diagonally above and to the vehicle front side of the buckle body 74, the latch enters the hole portion that is formed in the tongue 28 and, as a result, the tongue 28 is engaged with the buckle 72.

Figure 5:
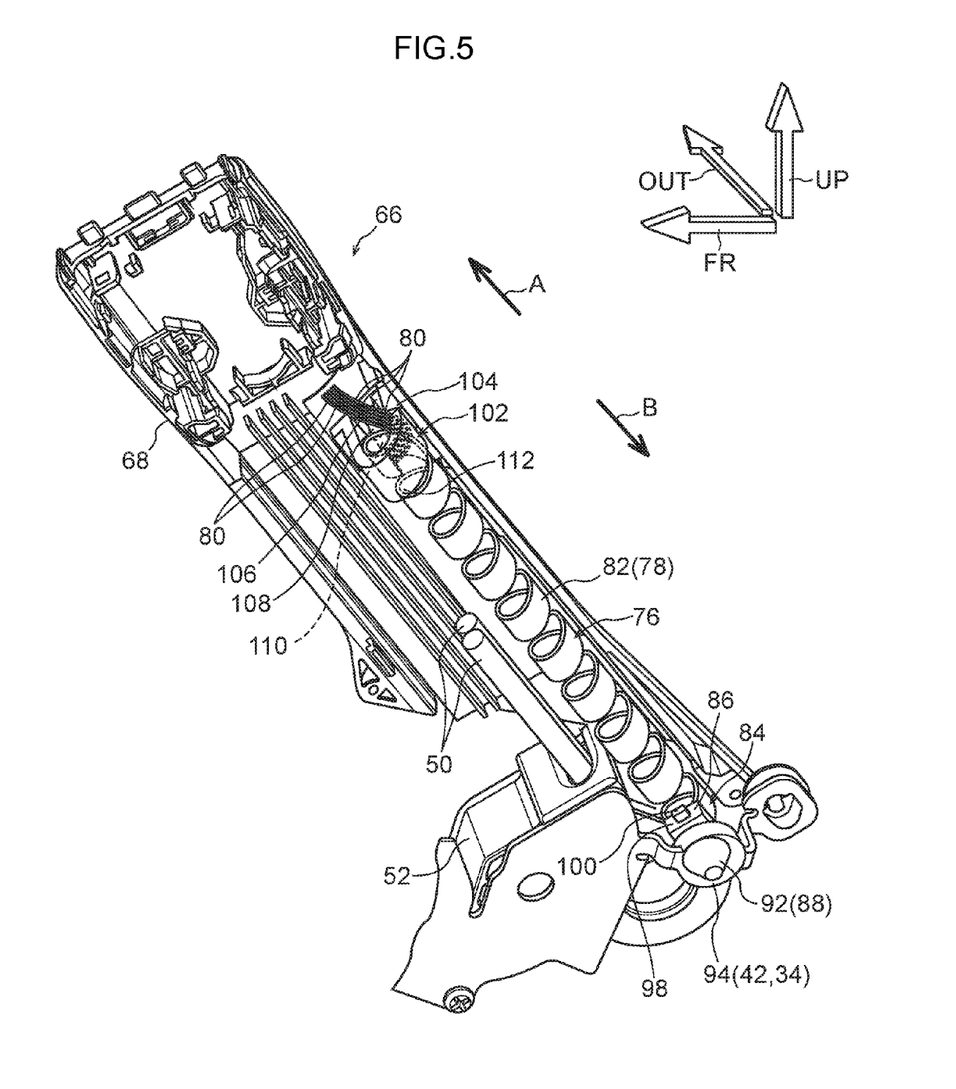
FIG. 5 is a perspective view showing the structure of a first cover component of a buckle cover and a helical portion of a curl cord, as well as areas peripheral thereto.

As is shown in FIG. 2, the present buckle device 10 is also provided with a curl cord 76 that serves as a cord member. The curl cord 76 is provided with a cover portion 78. As is shown in FIG. 5, the cover portion 78 is formed from a synthetic resin material in a narrow-width and elongated belt shape. As is shown in FIG. 8, a plurality of cord portions 80 are provided inside the cover portion 78, and these cord portions 80 are arranged in a row in the transverse (width) direction of the cover portion 78.

The curl cord 76 is also provided with a helical portion 82. The helical (spiral) portion 82 is placed inside the cord housing portion 62 of the buckle guide 58. The cover portion 78 of the curl cord 76 is formed in a helical (spiral) shape at the helical portion 82, and the helical portion 82 is able to expand and contract elastically in the direction of the center axis of its helix. As is shown in FIG. 5, the cord portions 80 inside the cover portion 78 of the curl cord 76 further extend from (extend beyond) a distal end portion (a distal end) in the longitudinal direction of the helical portion 82, and distal end portions in the longitudinal direction of the cord portions 80 are mechanically and electrically connected to a terminal (not shown in the drawings) of a buckle switch that is provided in the buckle 72. Namely, the distal end portions of the cord portions 80 are not covered by the cover portion 78 (the helical portion 82). In contrast, base end portions in the longitudinal direction of the cord portions 80 of the curl cord 76 are electrically connected either directly or indirectly to the aforementioned control unit (not shown in the drawings).

Figure 8:
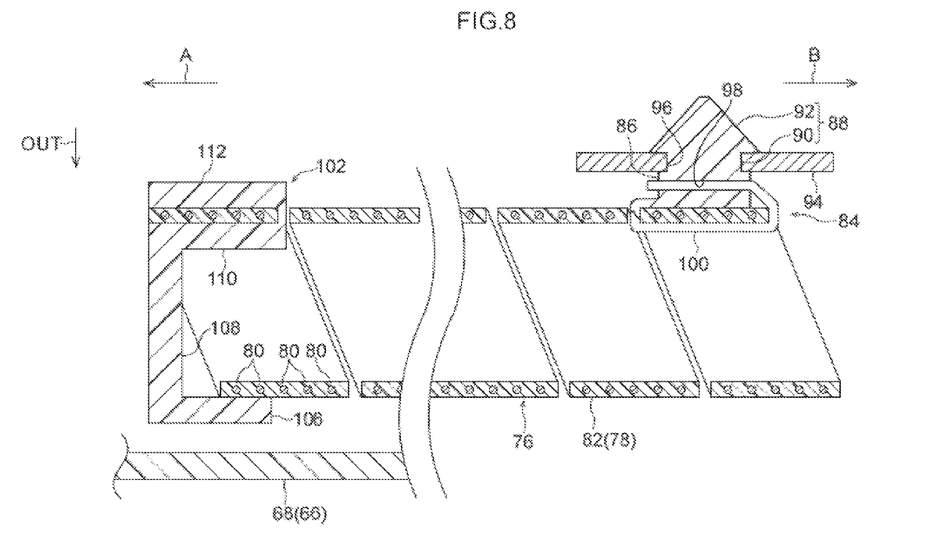
FIG. 8 is a cross-sectional view showing the structure of a holding of a distal end portion in a longitudinal direction of the helical portion of a curl cord, and the structure of a holding of a base end portion in a longitudinal direction of the helical portion of a curl cord.

As is shown in FIG. 5 and FIG. 8, a wrapping (bundling) band 84 that is made from synthetic resin is provided, which is as a base end side holding section, on a base end side in the longitudinal direction of the helical portion 82 of the curl cord 76. The wrapping band 84 is provided with a lock portion 86. The lock portion 86 is formed in a block shape, and is positioned facing the helical portion 82 in the thickness direction of the cover portion 78 of the curl cord 76 on the outer side of the helical portion 82 of the curl cord 76. A clip 88 is formed in the lock portion 86. As is shown in FIG. 8, the clip 88 is provided with a substantially circular column-shaped neck portion 90. The neck portion 90 is formed protruding from the lock portion 86 towards the side opposite to the helical portion 82 of the curl cord 76 such that the lock portion 86 is sandwiched.

A clip anchoring portion 92 is formed on the opposite side of the neck portion 90 from the lock portion 86. The clip anchoring portion 92 is formed in a cone shape or truncated cone shape, tapering towards the opposite side from the neck portion 90. The external diameter dimension, at the neck portion 90 side, of the clip anchoring portion 92 is larger than the external diameter dimension of the neck portion 90, and the clip anchoring portion 92 is formed on the same axis as the neck portion 90. A holding piece 94 extends towards the vehicle rear side from an end portion on the vehicle rear side of the guide wall 42 of the guide rail 36, so as to correspond to the clip 88. The holding piece 94 is bent towards the outer side in the vehicle transverse direction at the vehicle rear side of the wire guide 52 and extends from there towards the outer side in the vehicle transverse direction, further, the holding piece 94 is bent towards the vehicle rear side on the vehicle rear side of the cover plate 56 that closes off the wire guide groove 54 of the wire guide 52, and extends therefrom towards the vehicle rear side. A holding hole 96 is formed in an end portion on the vehicle rear side of the holding piece 94, and the clip 88 is inserted through and disposed at the holding hole 96 of the holding piece 94 such that the neck portion 90 of the clip 88 is located on the inner side of the holding hole 96. As a result of this, the clip 88 is caught (anchored) at and held in the holding piece 94 and, as a consequence, is also held in the guide rail 36.

As is shown in FIG. 5, a hole portion 98 having a substantially rectangular-shaped cross-section is formed in the lock portion 86 of the wrapping band 84. As is shown in FIG. 8, the hole portion 98 penetrates in the longitudinal direction of the buckle guide 58. In addition, a narrow-width belt-shaped band portion 100 is also formed in the lock portion 86. The band portion 100 extends diagonally downwards and to the vehicle rear (i.e., in the direction shown by the arrow B in FIG. 8) from a portion of the lock portion 86, which portion is at opposite side of the hole 98 from the clip 88.

The band portion 100 enters the inner side in the radial direction of the helix of the helical portion 82 from a side of an end portion on one side in the transverse direction (i.e., the side indicated by the arrow B in FIG. 8) of a helical portion which is located at diagonally the lowest side and the most rearward side of the vehicle in the helical portion 82 of the curl cord 76, and is then folded back diagonally upwards and to the vehicle front side. A distal end side in the longitudinal direction of the band portion 100 further extends towards the outer side in the radial direction of the helix of the helical portion 82 from a side of an end portion on another side in the transverse direction (i.e., from the side indicated by the arrow A in FIG. 8) of the helical portion of the helical portion 82. It is then inserted into the hole portion 98 from the end portion on the diagonally upward and vehicle front sides of the hole portion 98 in the lock portion 86, and a distal end portion in the longitudinal direction of the band portion 100 extends diagonally downwards and to the vehicle rear side from the end portion on the diagonally downward and vehicle rear sides of the hole portion 98.

The band portion 100 is engaged with a lock engaging portion (not shown in the drawings) on the inner side of the hole portion 98 of the lock portion 86 and, as a result of this, movement of the band portion 100 going out of the hole portion 98 in a diagonally upward and vehicle forward direction is prevented and blocked. As a result, the base end portion in the longitudinal direction of the helical portion 82 of the curl cord 76 is engaged with the wrapping band 84 from both the outer side in the radial direction of the helix and the inner side in the radial direction of the helix of the helical portion 82. As a consequence, the base end portion in the longitudinal direction of the helical portion 82 is held by the wrapping band 84. As has been described above, because the wrapping band 84 is held in (preferably, fixed at) the holding piece 94 of the guide rail 36, the base end portion in the longitudinal direction of the helical portion 82 of the curl cord 76 is held by (preferably, fixed at) the guide rail 36 via the wrapping band 84, and is thereby held by (preferably, fixed at) the wire guide 52.

Figure 7:
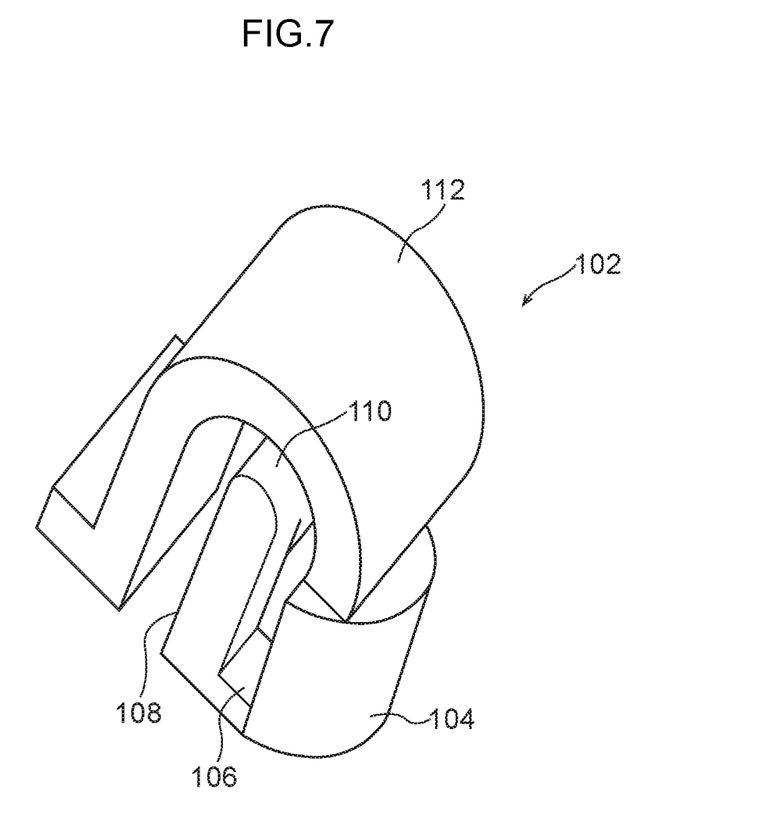
FIG. 7 is a perspective view showing a holding bracket.

As is shown in FIG. 5, a holding bracket 102 that is made from synthetic resin is provided as a distal end side holding section on the distal end side in the longitudinal direction of the helical portion 82 of the curl cord 76. As is shown in FIG. 7, the holding bracket 102 is provided with a mounting portion 104, and the mounting portion 104 of the holding bracket 102 is mounted on a cover side holding portion (not shown in the drawings) that is formed on a vehicle upper side portion of an inner side of the distal end portion in the longitudinal direction (i.e., an end portion on the side shown by the arrow A in FIG. 8) of the first cover component 68 of the buckle cover 66. As a result, the holding bracket 102 is held by (preferably, fixed at) the first cover component 68 of the buckle cover 66.

A base portion 106 is formed on an outer side portion in the vehicle transverse direction of the mounting portion 104 of the holding bracket 102. The base portion 106 extends towards the vehicle lower side from the mounting portion 104. A connecting piece 108 extends towards the inner side in the vehicle transverse direction from an end portion on the vehicle lower side of the base portion 106, and an inner side holding portion 110 is formed on an end portion on the inner side in the vehicle transverse direction of the connecting piece 108. The inner side holding portion 110 is formed in a rod shape, and the longitudinal direction of the inner side holding portion 110 is along in a direction that slopes towards the vehicle front-rear direction relative to the vehicle up-down direction (i.e., in the directions shown by the arrow A and the arrow B in FIG. 5). The inner side holding portion 110 is entered (inserted) on the inner side in the radial direction of the helix at the distal end portion in the longitudinal direction of the helical portion 82 of the curl cord 76, and is engaged with the helical portion 82 from the inner side in the radial direction of the helix.

An outer side holding portion 112 is formed in a portion on the outer side in the vehicle transverse direction of the mounting portion 104 of the holding bracket 102. The outer side holding portion 112 is curved in a concave shape that is open towards the outer side in the vehicle transverse direction, and is engaged with the helical portion 82 from the outer side in the radial direction of the helix at the distal end portion in the longitudinal direction of the helical portion 82 of the curl cord 76. In this way, in the holding bracket 102, the outer side holding portion 112 and the inner side holding portion 110 are engaged with the distal end portion in the longitudinal direction of the helical portion 82 from the outer side and from the inner side in the radial direction of the helix at the distal end portion in the longitudinal direction of the helical portion 82 of the curl cord 76. As a result of this, the distal end portion in the longitudinal direction of the helical portion 82 of the curl cord 76 is held by the holding bracket 102. As is described above, because the holding bracket 102 is held by the first cover component 68 of the buckle cover 66, the distal end portion in the longitudinal direction of the helical portion 82 of the curl cord 76 is held indirectly via the holding bracket 102 by the first cover component 68 of the buckle cover 66.

Operation and Effect of the First Embodiment

In the buckle device 10 of this seat belt device 12, when, for example, the door of a vehicle that corresponds to the seat 32 changes from a closed state to an open state, this change in the open/closed state of the door is detected by a detection device such as a door open/close detection unit such as a courtesy switch or the like. Moreover, when, for example, a vehicle occupant 114 sits in a seat, this action of sitting in the seat by the vehicle occupant 114 is detected by a detection device such as a vehicle occupant detection device such as a load sensor or the like that is provided in a seat cushion of the seat.

Due to the change in the state of the door or the seat that accompanies the entry of the vehicle occupant 114 into the vehicle, the level of the electrical signal that is output to the control unit from the detection device is switched. As a result, the motor actuator 46 is driven and the drive screw 44 is rotated. As a consequence of this, the slider 48 is made to slide towards the vehicle rear side while being guided by the guide walls 40 and 42 of the guide rail 36. As a result of this, when the wire ropes 50 are moved towards the distal end side in the longitudinal direction, the buckle body 74 is pushed diagonally upwards and towards the front of the vehicle by the wire ropes 50.

Figure 3:
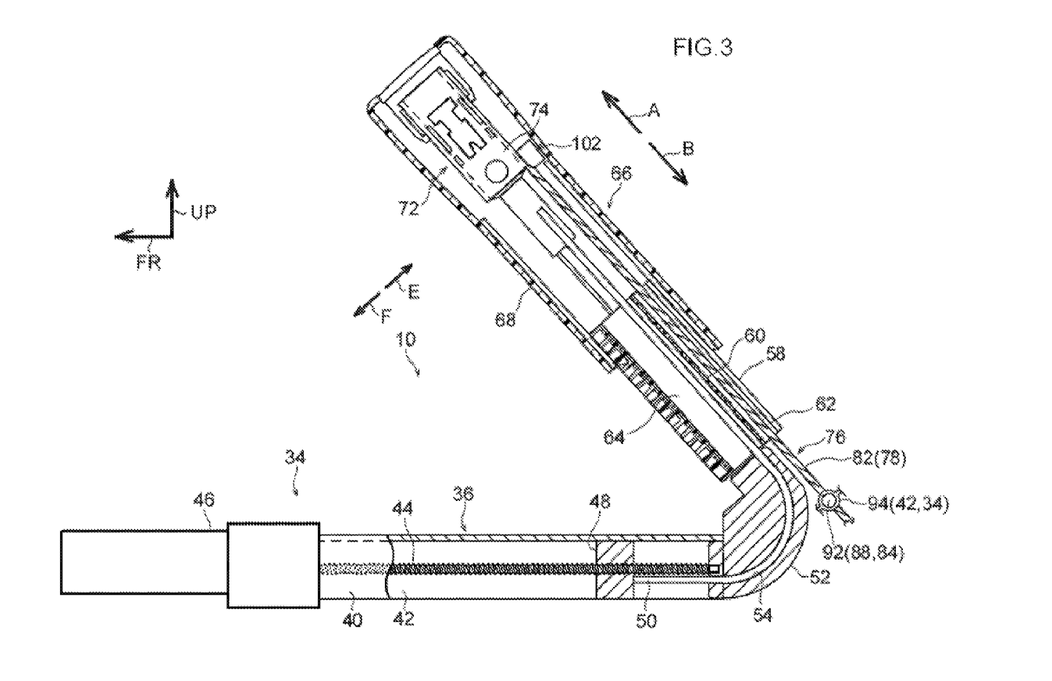
FIG. 3 is a side cross-sectional view corresponding to FIG. 2 showing a state in which a buckle cover has been moved.

When the pushing force from the wire ropes 50 is transmitted to the buckle cover 66 via the buckle body 74, the buckle cover 66 is guided by the buckle guide 58 and, as a result, as is shown in FIG. 3, the buckle cover 66 is moved diagonally upwards and towards the front side of the vehicle. In this way, as a result of the buckle cover 66 being moved, the vehicle occupant 114 is able to easily engage the tongue provided on the webbing of the seat belt device with the buckle 72, and the webbing can be easily fitted.

The cord portions 80 of the curl cord 76 are pulled out from the distal end portion in the longitudinal direction of the helical portion 82 of the curl cord 76, and the distal end portions in the longitudinal direction of the cord portions 80 of the curl cord 76 are electrically and mechanically connected to the terminal of the buckle switch of the buckle 72. Because of this, when the buckle cover 66 is moved by the driving force from the motor actuator 46 and is guided by the buckle guide 58, the distal end portions in the longitudinal direction of the cord portions 80 of the curl cord 76 that are connected to the terminal of the buckle switch of the buckle 72 are moved together with the buckle cover 66.

Figure 6:
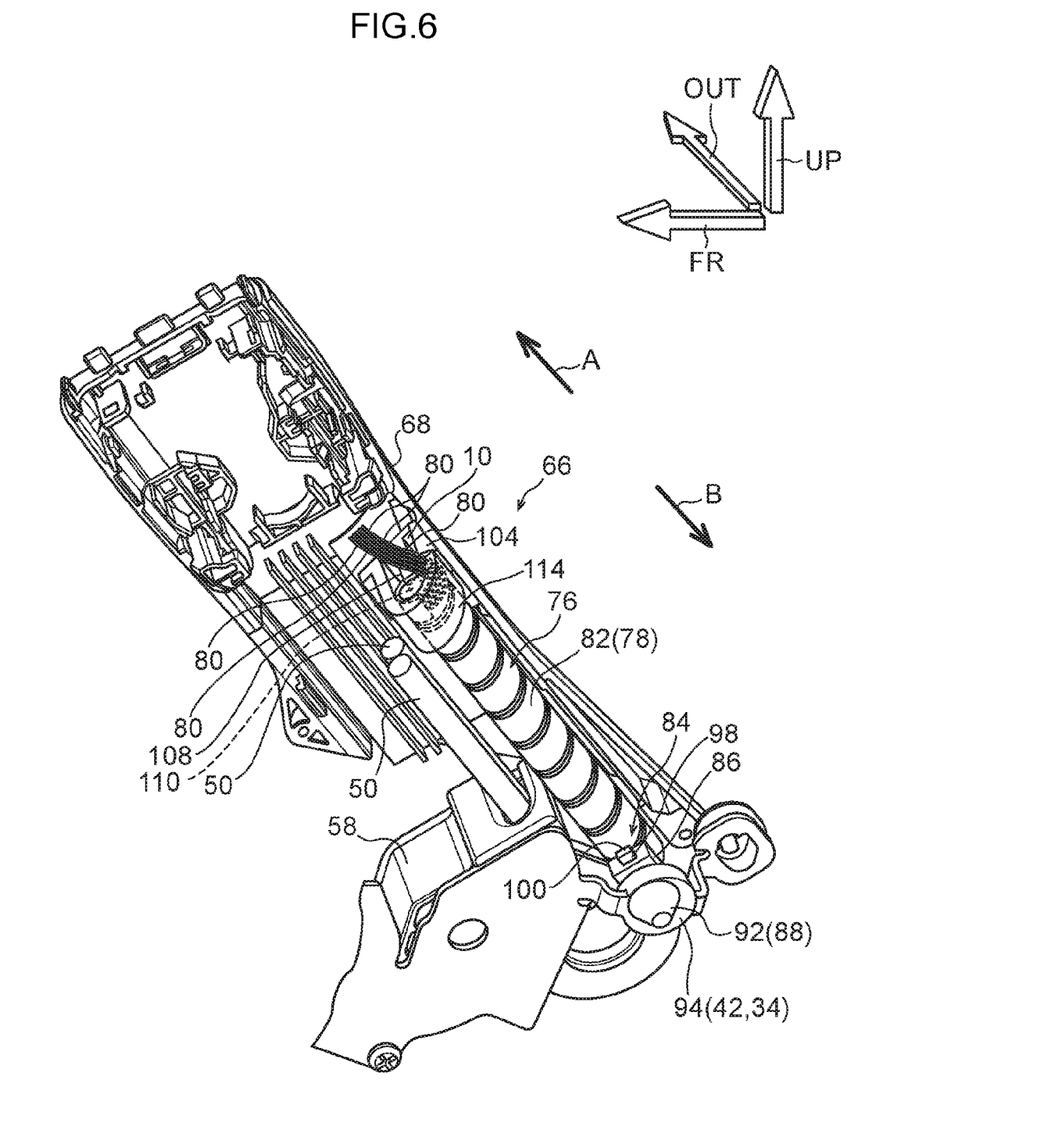
FIG. 6 is a perspective view corresponding to FIG. 5 showing a state in which a curl cord has been expanded.

Here, a distal end portion in the longitudinal direction of the helical portion 82 of the curl cord 76 is held by (in other words, connected to, or coupled to) the holding bracket 102 that is provided in the vehicle upper side portion of the inner side of the distal end portion (i.e., the end portion on the side indicated by the arrow A in FIG. 2) in the longitudinal direction of the first cover component 68 of the buckle cover 66. When the buckle cover 66 is moved by the drive force of the motor actuator 46, the holding bracket 102 is moved together with the buckle cover 66 and, as a result of this, as is shown in FIG. 3 and FIG. 6, the distal end portion in the longitudinal direction of the helical portion 82 of the curl cord 76 is moved together with the buckle cover 66.

Accordingly, even when the buckle cover 66 is moved by the drive force from the motor actuator 46, no relative displacement is generated between the distal end portion in the longitudinal direction of the helical portion 82 of the curl cord 76 and the distal end portions (i.e., the portions that connect with the buckle switch of the buckle 72) in the longitudinal direction of the cord portions 80 of the curl cord 76, or only a slight relative displacement is generated between the distal end portion in the longitudinal direction of the helical portion 82 of the curl cord 76 and the distal end portions in the longitudinal direction of the cord portions 80 of the curl cord 76.

Due to this, even when the buckle cover 66 is moved by the drive force from the motor actuator 46, there is no tensile force that might cause the distal end portions in the longitudinal direction of the cord portions 80 of the curl cord 76 to separate from the terminal of the buckle switch of the buckle 72 acting on the distal end portions in the longitudinal direction of the cord portions 80 of the curl cord 76, or such tensile force is minimal. Accordingly, even when the buckle cover 66 is moved by the drive force from the motor actuator 46, excellent electrical and mechanical connections can be maintained between the distal end portions in the longitudinal direction of the cord portions 80 of the curl cord 76 and the terminal of the buckle switch of the buckle 72.

The inner side holding portion 110 of the holding bracket 102 is engaged with the distal end portion in the longitudinal direction of the helical portion 82 of the curl cord 76 from the inner side in the radial direction of the helix of the helical portion 82, while the outer side holding portion 112 of the holding bracket 102 is engaged with the distal end portion in the longitudinal direction of the helical portion 82 of the curl cord 76 from the outer side in the radial direction of the helix. As a result, the distal end portion in the longitudinal direction of the helical portion 82 is held by the holding bracket 102. Here, the longitudinal direction of the inner side holding portion 110 of the bracket 102 is aligned with (is along) a direction that slopes in the vehicle front-rear direction relative to the vehicle up-down direction (i.e., in the directions shown by the arrow A and the arrow B in FIG. 2 and FIG. 3). Due to this, the distal end portion in the longitudinal direction of the helical portion 82 of the curl cord 76 can be held by the bracket 102 without any bending being generated that might cause the helical configuration to be seriously damaged in the distal end portion in the longitudinal direction of the helical portion 82 of the curl cord 76.

On the other hand, the base end portion in the longitudinal direction of the helical portion 82 of the curl cord 76 is held (in other words, connected to, or coupled to) by the wrapping band 84, and the base end portion in the longitudinal direction of the helical portion 82 of the curl cord 76 is also held (in other words, connected to, or coupled to) via the wrapping band 84 by the wire guide 52. As a result, when the buckle cover 66 is moved by the drive force from the motor actuator 46, the curl cord 76 expands or contracts between the base end portion in the longitudinal direction of the helical portion 82 and the distal end portion in the longitudinal direction of the helical portion 82.

Due to this, even when the buckle cover 66 is moved by the drive force of the motor actuator 46, at a portion which is further to the base end side in the longitudinal direction of the curl cord 76 than the base end portion in the longitudinal direction of the helical portion 82, that is being held by the wrapping band 84, no displacement in the longitudinal direction of the curl cord 76 occurs in the curl cord 76, or only a minimal amount of displacement in the longitudinal direction of the curl cord 76 occurs in the curl cord 76. Accordingly, even when the buckle cover 66 is moved by the drive force of the motor actuator 46, it is possible to maintain excellent electrical and mechanical connections between the base end portion in the longitudinal direction of the curl cord 76 and a terminal or the like of an ECU or the like.

In the base end portion in the longitudinal direction of the helical portion 82 of the curl cord 76, the band portion 100 of the wrapping band 84 is engaged with the helical portion 82 from the inner side in the radial direction of the helix of the helical portion 82, and the lock portion 86 of the wrapping band 84 is engaged with the helical portion 82 from the outer side in the radial direction of the helix of the helical portion 82. As a result, the base end portion in the longitudinal direction of the helical portion 82 is held by the wrapping band 84.

Here, the band portion 100 of the wrapping band 84 is entered into the inner side in the radial direction of the helix of the helical portion 82 from the side of the end portion on the one side in the transverse direction of the cover portion 78 of the helical portion 82, and it extends towards diagonally front from lower side toward upper side of the vehicle (in the direction shown by the arrow A in FIG. 8) at the inner side in the radial direction of the helix of the helical portion 82, and then it exits on the outer side in the radial direction of the helix of the helical portion 82 from the side of the end portion on the another side in the transverse direction of the cover portion 78 of the helical portion 82. Due to this, the base end portion in the longitudinal direction of the helical portion 82 of the curl cord 76 can be held in the wrapping band 84 without any bending being generated that might cause the helical configuration to be seriously damaged in the base end portion in the longitudinal direction of the helical portion 82 of the curl cord 76.

When the buckle cover 66 is moved by the drive force from the motor actuator 46, in the curl cord 76, the distal end portion in the longitudinal direction of the helical portion 82 that is being held by the holding bracket 102 and the base end portion in the longitudinal direction of the helical portion 82 that is being held by the wrapping band 84 are moved towards and away from each other (approaching and separating each other) in the longitudinal directions of the buckle guide 58 and the buckle cover 66.

Here, the helical portion 82 of the curl cord 76 is able to expand and contract elastically in the longitudinal direction thereof. Due to this, as is described above, due to the distal end portion in the longitudinal direction and the base end portion in the longitudinal direction of the helical portion 82 of the curl cord 76 moving towards and away from each other in the longitudinal directions of the buckle guide 58 and the buckle cover 66, the helical portion 82 is expanded and contracted elastically in the longitudinal direction thereof. Due to this, when the distal end portion in the longitudinal direction and the base end portion in the longitudinal direction of the helical portion 82 of the curl cord 76 are moving towards and away from each other, it is possible to either prevent or suppress an intermediate portion in the longitudinal direction of the helical portion 82 from becoming flexure or slack and striking against the inner side surface of the buckle cover 66, the inner side surface of the buckle guide 58 and the like. As a result, it is possible to improve the quietness performance when the buckle cover 66 is being moved by the drive force from the motor actuator 46.

Moreover, in the present embodiment, the clip 88 is held by the holding piece 49 of the guide wall 42 of the guide rail 36. The guide rail 36 is formed by a metal plate component made from iron or stainless steel or the like, and has enough rigidity to be able to support the motor actuator 46 and the drive screw 44 and the like. Due to this, the clip 88 can be firmly held.

On the other hand, the distal end side in the longitudinal direction of the band portion 100 extends diagonally downwards and to the vehicle rear side from the end portion on the vehicle diagonally rearward and downward side of the hole portion 98 of the lock portion 86 of the clip 88. Due to this, the distal end portion in the longitudinal direction of the band portion 100 does not abut the second helical portion and the like from the vehicle diagonally rearward and bottom side in the helical portion 82 of the curl cord 76. Due to this, the helical portion 82 of the curl cord 76 can be smoothly expanded and contracted.

Note that in the present embodiment, a structure is employed in which the portion that holds the clip 88 is formed in the guide rail 36, however, it is also possible for the portion that holds the clip 88 to be formed in a component other than the guide rail 36 such as in the cover plate 56 or the buckle cover 66 or the like.

Second Embodiment

Next, a second embodiment will be described. Note that in the description of the present embodiment, portions that are fundamentally the same as in the above-described first embodiment are given the same symbols and numerals and any detailed description thereof is omitted.

Figure 9:
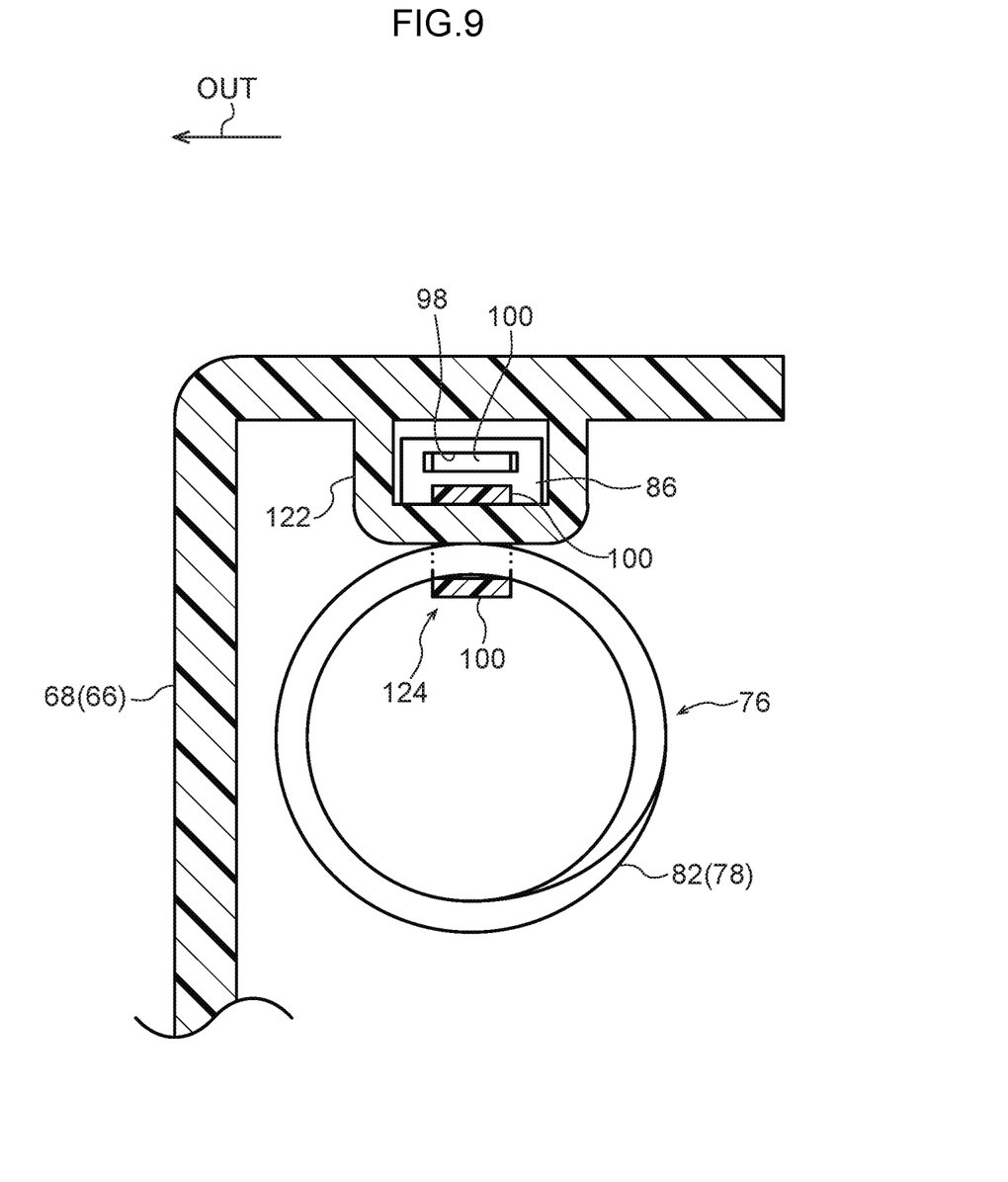
FIG. 9 is a cross-sectional view showing the structure of a holding of a distal end portion in a longitudinal direction of a helical portion of a curl cord in a second embodiment.

As is shown in FIG. 9, in the present embodiment, a cover side holding portion 122 is formed on the inner side of the first cover component of the buckle cover 66. The cover side holding portion 122 is penetrated in the longitudinal direction of the buckle cover 66, and a wrapping (bundling) band 124 can be disposed as a distal end side holding member such that it penetrates the cover side holding portion 122. The wrapping band 124 of the present embodiment has fundamentally the same structure as the wrapping band 84 of the above-described first embodiment, however, the wrapping band 124 differs from the wrapping band 84 in that it is not provided with the clip 88.

A band portion 100 of the wrapping band 124 that has been penetrated through the cover side holding portion 122 enters the inner side in the radial direction of the helix of the helical portion 82 from the side of an end portion on one side in the transverse direction of a helical portion at the distal end portion in the longitudinal direction of the helical portion 82 of the curl cord 76, and is then folded back diagonally downwards and to the vehicle rear. A distal end side in the longitudinal direction of the band portion 100 extends further towards the outer side in the radial direction of the helix of the helical portion 82 from the side of an end portion on another side in the transverse direction of the helical portion at the distal end portion in the longitudinal direction of the helical portion 82 of the curl cord 76. It is then inserted into the hole portion 98 from the end portion on the diagonally downward and vehicle rear side of the hole portion 98 in the lock portion 86.

In the present embodiment, the distal end portion in the longitudinal direction of the helical portion 82 of the curl cord 76 is held by the wrapping band 124, and the distal end portion in the longitudinal direction of the helical portion 82 of the curl cord 76 is further held via the wrapping band 124 by the buckle cover 66. Due to this, when the buckle cover 66 is moved by the drive force from the motor actuator 46, the holding bracket 102 is moved together with the buckle cover 66 and, as a result of this, the distal end portion in the longitudinal direction of the helical portion 82 of the curl cord 76 is moved together with the buckle cover 66.

Accordingly, even when the buckle cover 66 is moved by the drive force from the motor actuator 46, no relative displacement is generated between the distal end portion in the longitudinal direction of the helical portion 82 of the curl cord 76 and the distal end portions (i.e., the portions that connect with the buckle switch of the buckle 72) in the longitudinal direction of the cord portions 80 of the curl cord 76, or only a slight relative displacement is generated between the distal end portion in the longitudinal direction of the helical portion 82 of the curl cord 76 and the distal end portions in the longitudinal direction of the cord portions 80 of the curl cord 76.

Due to this, even when the buckle cover 66 is moved by the drive force from the motor actuator 46, there is no tensile force that might cause the distal end portions in the longitudinal direction of the cord portions 80 of the curl cord 76 to separate from the terminal of the buckle switch of the buckle 72 acting on the distal end portions in the longitudinal direction of the cord portions 80 of the curl cord 76, or any such tensile force is minimal. Accordingly, even when the buckle cover 66 is moved by the drive force from the motor actuator 46, excellent electrical and mechanical connections can be maintained between the distal end portions in the longitudinal direction of the cord portions 80 of the curl cord 76 and the terminal of the buckle switch of the buckle 72.

In the distal end portion in the longitudinal direction of the helical portion 82 of the curl cord 76, the band portion 100 of the wrapping band 124 is engaged with the helical portion 82 from the inner side in the radial direction of the helix of the helical portion 82, while the lock portion 86 of the wrapping band 124 is engaged with the helical portion 82 from the outer side in the radial direction of the helix of the helical portion 82. As a result, the distal end portion in the longitudinal direction of the helical portion 82 is held by the wrapping band 124.

Here, the band portion 100 of the wrapping band 124 is entered into the inner side in the radial direction of the helix of the helical portion 82 from the side of the end portion on the one side in the transverse direction of the cover portion 78 of the helical portion 82, and it extends diagonally downwards towards the rear of the vehicle at the inner side in the radial direction of the helix of the helical portion 82, and then it exits on the outer side in the radial direction of the helix of the helical portion 82 from the side of the end portion on the another side in the transverse direction of the cover portion 78 of the helical portion 82. Due to this, the distal end portion in the longitudinal direction of the helical portion 82 of the curl cord 76 can be held by the wrapping band 124 without any bending being generated that might cause the helical configuration to be seriously damaged in the distal end portion in the longitudinal direction of the helical portion 82 of the curl cord 76.

Note that, in each of the above-described embodiments, a structure is employed in which the distal end side holding section is a separate body from the buckle cover 66 and the buckle 72. However, it is also possible to employ a structure in which the distal end side holding device is formed in the buckle cover 66 or the buckle 72.

Note also that, in each of the above-described embodiments, a structure is employed in which the base end side holding section is a separate body from the guide rail 36, the wire guide 52, the cover plate 56, and the buckle guide 58 that structure the supporting portion. However, it is also possible to employ a structure in which the base end side holding section is formed in any one of the respective components that structure the supporting portion.

What is claimed is:

1. A buckle device comprising:
a buckle with which a tongue of a seatbelt device is engaged, and that is able to move relative to a vehicle body;
a cord member whose distal end portion in a longitudinal direction is connected to the buckle; and
a distal end side holding section that is provided so as to be able to move together with the buckle, and that holds a part of the cord member, which part is at further toward a base end side in the longitudinal direction of the cord member than the distal end portion of the cord member, such that, when the buckle moves relative to the vehicle body, the distal end of the cord member is configured to move together with the buckle relative to the vehicle body,
wherein the cord member is mechanically and electrically connected to the buckle.

2. The buckle device of claim 1, wherein an expanding and contracting portion that is part of the cord member and is able to expand and contract in the longitudinal direction of the cord member is provided at the cord member at a side which is further toward the base end side in the longitudinal direction of the cord member than the distal end portion the cord member, and the distal end side holding section holds a distal end portion in a longitudinal direction of the expanding and contracting portion.

3. The buckle device of claim 2, wherein the expanding and contracting portion is formed in a helical shape whose central axis is aligned with the longitudinal direction of the cord member, and is able to expand and contract elastically in a direction of the central axis.

4. The buckle device of claim 3, wherein the distal end side holding section comprises: an inner side holding portion that is engaged with the expanding and contracting portion from an inner side in a radial direction of a helix of the expanding and contracting portion; and an outer side holding portion that is engaged with the expanding and contracting portion from an outer side in a radial direction of the helix of the expanding and contracting portion, and that, together with the inner side holding portion, holds the expanding and contracting portion.

5. The buckle device of claim 3, further comprising:
a supporting portion that is provided at a vehicle body side, and by which the buckle is movably supported; and
a base end side holding section that is provided at the supporting portion, and that holds a base end portion in the longitudinal direction of the expanding and contracting portion.

6. The buckle device of claim 4, further comprising:
a supporting portion that is provided at a vehicle body side, and by which the buckle is movably supported; and
a base end side holding section that is provided at the supporting portion, and that holds a base end portion in the longitudinal direction of the expanding and contracting portion.

7. The buckle device of claim 2, wherein the distal end portion of the cord member, which is connected to the buckle, extends from the distal end portion of the expanding and contracting portion toward a distal end side of the cord member.

8. The buckle device of claim 3, wherein the distal end portion of the cord member, which is connected to the buckle, extends from the distal end portion of the expanding and contracting portion toward a distal end side of the cord member.

9. The buckle device of claim 1, wherein the distal end portion of the cord member and the buckle are configured to move relative to the base end side of the cord indirectly connected to the vehicle body.

10. The buckle device of claim 1, wherein the buckle device further comprises
a moving member at which the buckle is provided and which is configured to move relative to the vehicle body, and
the distal end side holding section is fixed at the moving member.

11. The buckle device of claim 1, wherein when the buckle moves relative to the vehicle body, the distal end side holding section, a moving member at which the buckle is provided, the buckle, and the distal end portion of the cord member are configured to all move together relative to the vehicle body.

* * * * *